Sept. 20, 1971     C. C. HOFFMANN ETAL     3,606,513
ROD TYPE TRAY SLIDE
Filed April 23, 1970     2 Sheets-Sheet 1
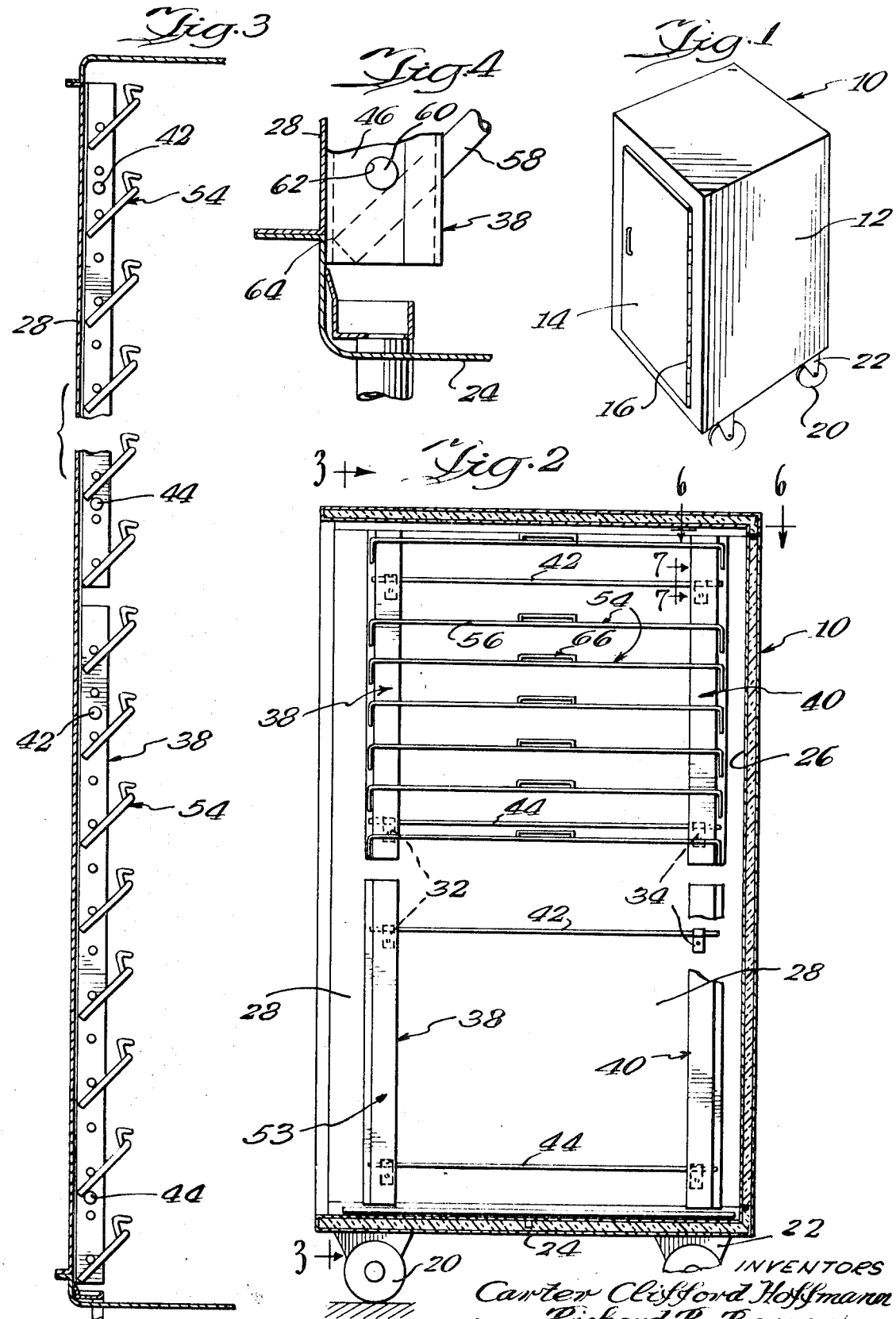

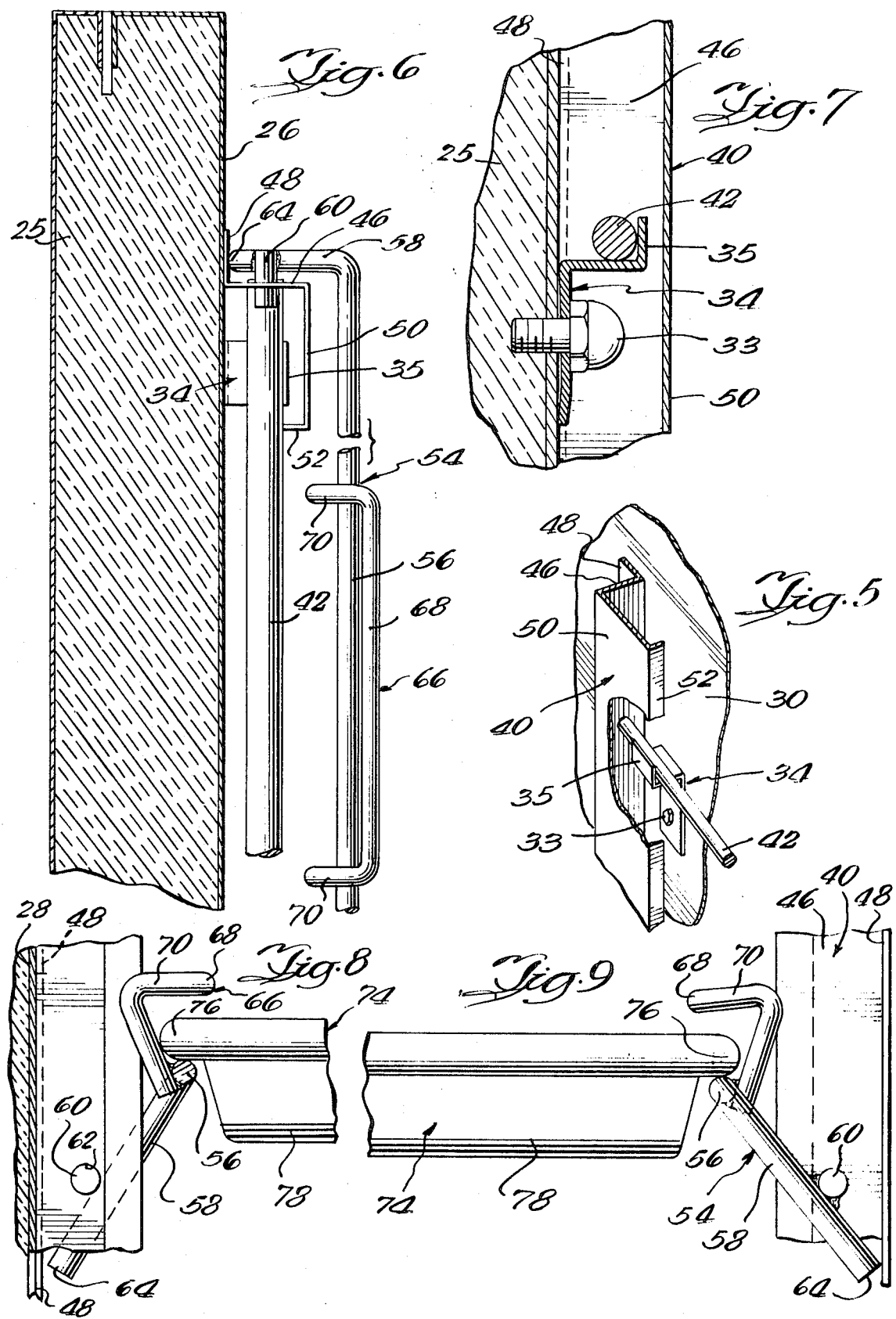

United States Patent Office 3,606,513
Patented Sept. 20, 1971

3,606,513
ROD TYPE TRAY SLIDE
Carter Clifford Hoffmann, Lake Forest, and Richard R. Berger, Antioch, Ill., assignors to Carter-Hoffmann Corp.
Filed Apr. 23, 1970, Ser. No. 31,193
Int. Cl. A47b 77/00
U.S. Cl. 312—351      11 Claims

ABSTRACT OF THE DISCLOSURE

An insulated food serving cart is provided with removable rack assemblies having pivoted tray support members structured in such a way as to positively support vertically spaced trays without the tray support members interfering with the contents of the tray and at the same time allowing for variations in the tray dimensions.

FIELD OF THE INVENTION

This invention relates to food serving carts and more particularly to improved removable and adjustable tray supporting members therefor.

DESCRIPTION OF THE PRIOR ART

A food serving cart is generally a box shaped structure having a door and being mounted on wheels. Inside the cart is a plurality of vertically spaced apart shelves upon which individual trays are rested while the cart is wheeled from the food preparation area to the food serving area. Sanitation within each cart has always been a problem and with the individual deep shelves it has been almost impossible to properly and completely keep the cart interior clean.

Some carts have been made with removable shelves and with removable brackets, however, portions of the brackets project into the storage area of the cart and not only limit the usable storage area but also are responsible for knocking over tall items resting on the trays which wastes food and creates cleaning problems in the cart. In addition, the brackets are of a fixed dimension and thereby are not usable with out of size or distorted trays.

SUMMARY OF THE INVENTION

This invention is directed toward improved structuring within an insulated food serving and storage cart which includes racks and tray support members that can be easily removed for cleaning by a simple upward movement on each rack. Each cart has mounted on its inside walls at least one pair of mating racks with plural vertically spaced apart tray supporting members, each supporting member being rockable or pivoted about a horizontal axis a limited amount sufficient to allow for not only minor variations in the dimensions of individual trays but also minor variations caused by distortions of the trays.

BRIEF DESCRIPTION OF THE DRAWINGS

FIG. 1 is a front perspective view of a food serving cart of the type in which our invention may be used;

FIG. 2 is a vertical cross-sectional view through the cart of FIG. 1 looking toward one wall of the device upon which one embodiment of our invention is mounted;

FIG. 3 is a vertical cross-sectional view taken along the line 3—3 of FIG. 2;

FIG. 4 is an enlarged view of the bottom corner of FIG. 3;

FIG. 5 is an enlarged perspective view partially broken away of a wall bracket operatively connected to one corner of a rack;

FIG. 6 is an enlarged partial cross-sectional view taken along the line 6—6 of FIG. 2;

FIG. 7 is an enlarged partial cross-sectional view taken along the line 7—7 of FIG. 2;

FIG. 8 is an enlarged partial view of the pivoted support member in use with an oversized or distorted tray; and FIG. 9 is an enlarged partial view of the pivoted support member in use with a standard size tray.

DESCRIPTION OF A PREFERRED EMBODIMENT

Referring to the drawings wherein like reference numerals refer to like parts throughout the several views, a food serving cart 10 is provided and has a rectangular box shaped housing 12 with a door 14 hinged at 16 over an opening 18 in one side wall of the cart. A set of wheels 20 are mounted on brackets 22 mounted on the bottom 24 of the cart so that the cart may be wheeled from one location to another. The housing 12 including the door 14 is insulated as at 25 so as to maintain the inside of the housing either warm or cold as the need dictates. The inside of the housing has a substantially continuous surface 26 which can be easily cleaned and sanitized and may be stainless steel or finished with an enamel or other appropriate surface.

The two opposite facing inside walls 28, 30 present continuous unbroken surfaces except for the vertically spaced pairs of horizontally spaced brackets 32, 34 which are secured to the walls by screws 33 or the like. As shown in FIG. 2, four pairs of brackets 32, 34 are illustrated in position on the wall 28 and mating comparable pairs of brackets are mounted on wall 30. Each bracket 32, 34 has a holding and retaining portion 35 for a purpose to appear hereinafter.

Mounted on each two pairs of brackets 32, 34 is a rod rack assembly 36 which is comprised of a pair of vertically disposed contoured or shaped rack posts 38, 40 which are held spaced apart by a pair of vertically spaced bars 42, 44. The end of each bar is welded or otherwise permanently affixed to a web 46 of the rack posts 38, 40 as can best be seen in FIGS. 5 and 6. The contoured rack posts 38 and 40 are identical but are mounted in a reversed manner. The posts 38, 40 each have an abutting ledge 48 formed at a right angle to one edge of the web 46. Connected to the other edge of the web 46 is a shield 50 which has an inturned flange 52 adapted to bear against the bars 42, 44. The combined action of the two posts 38, 40, the bars 42, 44 and the abutting flanges 52 produces a rigid box frame or rack 53.

Mounted between each pair of rack posts 38, 40 is a plurality of vertically spaced rod shaped tray support members 54 which have a main elongate body portion 56 integrally connected to right angled short end portions 58 upon each one of which is attached as by welding a short pivot pin 60. The pivot pins 60 have axes lying parallel to the axis of the body portion 56 and are adapted to project into openings 62 in the webs 46 of the rack posts 38, 40. The end portions 58 of the tray support members 54 extend beyond the connection to the pivot pin 60 an amount sufficient for the end 64 to abut against the ledge 48 so as to support the body portion 56 of the support member 54 a predetermined distance from the wall of the housing 11 as is best shown in FIGS. 2, 3, 6 and 9. Generally located centrally of the body portion 56 is a tray guide 66 which is composed of a body part 68 and integrally formed reverse bent side legs 70 which legs are secured as by welding to the rear and lower portion of the body portion 56 of the support member 54. The tray guide 66 is a relatively short member compared to the support member and is mounted on the tray support member in such a way as to have its body part 68 spaced slightly inward and above the body portion 56 of the tray support member.

In practice a box frame or rack 53 which is composed of the posts 32, 34 and bars 42, 44 has a plurality of tray supporting memebrs 54 assembled therewith by spreading the end portions 58 of each member until the pivot pins 60 clear the webs 46 and drop into the openings 62 in said webs 46. Upon release of the end portions 58 the pins will seat in the openings in the webs and the ends 64 of the end portions 62 will abut against the abutting surface 48 of the rack posts. When the desired number of support members 54 are assembled to the rack or frame, the rack or frame 53 is assembled in the housing by aligning the brackets 32, 34 with the inside of the rack posts 38, 40 and by allowing the bars 42, 44 to align with and (upon lowering of the frame) to nest with the retaining portions 35 of the brackets to secure the rack or frame and tray support members to the wall of the housing. An appropriate number of racks 53, in the illustrated form four are shown, are assembled and installed in the housing so that one body portion 56 of a support member will align with a mating portion 56 of another support member on the opposite wall to form a tray support structure therebetween.

Trays 74 which have rolled edges 76 and a shallow pan section 78 for supporting food or dishes therein are quite widely used in the food serving business and are somewhat standard in size when purchased. Several different standard widths are in common use. Although when purchased the distance between the extremes of the edges 76 of one tray to another is within small fractions of an inch, after use the trays become bent, distorted and generally misshaped so that the distance from the outer surface of edge 76 to edge 76 can vary by up to one half inch or more. Our pivoted tray support members are designed to support a minimum tolerable edge to edge distance of a tray as shown in FIG. 9, wherein the ends 64 of the end portions 58 of the support members 54 engage with and bear against the abutting surfaces 48 of the rack posts. In the alternative, a distorted or enlarged edge to edge sized tray, as shown in FIG. 8, rocks or pivots the support member 54 about the axes of the pins 60 thereby moving the ends 64 away from the surface 48 to tolerate the increased size and to still adequately support the trays.

The legs 70 on the guide 66 serve to center the tray 74 so that the tray cannot shift to one side or the other and thereby permit the tray edge 76 to drop off the opposite body portion 56 of support member 54. The overhanging body part 68 of the guide 66 not only guides the trays into position on the support members but also prevents the trays from bouncing up and off the support members when the cart is wheeled over a rough surface.

An additional advantage lies in the fact that the tray guides 66 and support member 54 can move to tolerate a wide range of tray sizes without a fixed overhanging platform projecting into the center of the housing and interfering with the contents of the tray. That is, heretofore to provide a large enough support for the wide variation in tray sizes, long projecting supports extended into the housing from the walls which projections served to interfere with upstanding stacks of dishes or glassware standing on the next lower tray, thereby either knocking the dishes or glassware over or spilling the contents of said dishes or glassware. The pivoted or rockable tray support members have a minimum projection into the housing while providing a maximum support structure for tray width variations.

The frames or racks 53 can be quickly and easily removed from the housing whereupon the cart interior can be efficiently cleaned and sanitized. The tray support members are inexpensive to manufacture from bar stock and the connections between parts are shown as simple spot welds. It is to be understood that the support members could be made from other shaped materials and the connections could be other than welds without departing from our inventive concept.

We claim:

1. A housing having means for supporting at least one tray therein, said means comprising a pair of support members mounted in horizontally disposed spaced apart relationship on opposite walls in said housing, horizontally disposed means on the opposite end portions of each support member for permitting a limited rocking of said support member, means on said support member for holding said support member in a support position and for permitting said rocking movement upwardly and toward said adjacent wall to enlarge the space between the aligned pair of support members.

2. The housing as claimed in claim 1 wherein said horizontally disposed means comprises a pivot pin and said support member is an elongate rod shaped element having angled end portions to each of which is connected one of said pivot pins.

3. The housing as claimed in claim 2 wherein the support members are mounted on racks and means mounted on the walls of the housing for removably supporting each rack.

4. The housing as claimed in claim 3 wherein each rack is comprised of a pair of rack posts held spaced apart by vertically spaced horizontal bars, said bars operatively engaging with said means mounted on the housing walls for removably hanging said rack to said housing.

5. The housing as claimed in claim 4 wherein said pivot pins on each support member nest in openings in said rack posts whereby said support member is permitted to rock.

6. The housing as claimed in claim 5 wherein said means on said support member for holding said support member in support position is an extension of said end portions beyond the connection of the pivot pin which engages with a portion of the adjoining rack posts to provide a stop for said support member in one direction while permitting pivoting or rocking movement of said support member in the opposite direction whereby the space between opposite support members can be enlarged.

7. A food service cart having a housing with an access opening in one wall thereof, a door for closing said access opening, and means in said housing for supporting at least one tray, said means comprising a pair of rod shaped tray support members mounted in horizontally disposed spaced apart relationship on opposite walls in said housing, horiozntally disposed pivot means on the opposite end portions of each tray support member, each pivot means coacting with means on the adjacent wall of said housing for permitting a limited rocking motion of said support member in a tray support position and permitting said rocking movement upwardly and toward said adjacent wall to enlarge the space between the aligned pair of tray support members whereby wider or distorted trays may be accommodated on said tray support members.

8. The food service cart as claimed in claim 7 wherein said tray supporting means comprises a pair of spaced apart racks carried by opposite walls of the housing.

9. The food service cart as claimed in claim 8 wherein each rack comprises a pair of rack posts held together by horizontally disposed bars, and bracket means on the walls of the housing, said bars engaging with said bracket means for removably supporting said racks on said walls.

10. The food service cart as claimed in claim 9 wherein the pivot means of each support member nests in openings in said rack posts with said stop means bearing against a portion of the rack posts to limit downward movement of the support member while permitting rocking movement upward and toward the adjacent wall of the housing for enlarging the distance between aligned support members on opposite sidewalls of the housing.

11. In an insulated food service cart having a housing with an access opening in one wall thereof and door means for closing said access opening, in combination with means in said housing for supporting a plurality of vertically spaced apart trays, said last named means comprising a pair of racks removably mounted on opposite side walls of said housing, each rack having a pair of rack posts held apart by a pair of bar members, said bar members engaging with brackets on the wall of said housing for supporting said rack therein, rod shaped horizontally disposed tray support members having inturned end portions, horizontally disposed pivot means carried by said end portions of the tray support member, said pivot means nesting in openings in said rack posts for limited rocking motion of said support member about the horizontal axis of said pivot means, the ends of said end portions extending beyond said pivot means to form stop means on said support member, said stop means engaging with a portion of said rack posts to hold said support members in a tray support position while permitting said rocking movement upwardly and toward said adjacent wall to enlarge the space between an aligned pair of tray support members whereby wider or distorted trays may be accommodated on said tray support members.

References Cited

UNITED STATES PATENTS

| | | | |
|---|---|---|---|
| 2,729,498 | 1/1956 | Law | 211—126X |
| 3,152,698 | 10/1964 | Maddox | 211—126 |
| 3,199,683 | 8/1965 | Graswich | 211—126X |
| 3,351,406 | 11/1967 | Ropiequet et al. | 312—332 |
| 3,531,169 | 9/1970 | Hoffmann et al. | 312—236 |

JAMES T. McCALL, Primary Examiner

U.S. Cl. X.R.

211—126; 312—332